US005375326A

United States Patent [19]

Usui et al.

[11] Patent Number: 5,375,326

[45] Date of Patent: Dec. 27, 1994

[54] METHOD OF MANUFACTURING INK JET HEAD

[75] Inventors: Minoru Usui; Takahiro Katakura; Hideaki Sonehara; Takahiro Naka; Osamu Nakamura, all of Nagano, Japan

[73] Assignee: Seiko Epson Corporation, Tokyo, Japan

[21] Appl. No.: 11,152

[22] Filed: Jan. 29, 1993

[30] Foreign Application Priority Data

| | | | |
|---|---|---|---|
| Feb. 6, 1992 | [JP] | Japan | 4-21296 |
| Feb. 6, 1992 | [JP] | Japan | 4-21298 |
| Jun. 5, 1992 | [JP] | Japan | 4-145773 |
| Dec. 25, 1992 | [JP] | Japan | 4-359275 |

[51] Int. Cl.[5] ........ B23P 15/00

[52] U.S. Cl. ........ 29/890.1; 346/139 R

[58] Field of Search ........ 29/890.1, 428; 346/1.1, 346/140 R

[56] References Cited

FOREIGN PATENT DOCUMENTS

| | | | |
|---|---|---|---|
| 0182449 | 11/1982 | Japan | 29/890.1 |
| 60-8953 | 3/1985 | Japan . | |
| 61-23832 | 6/1986 | Japan . | |
| 0191645 | 8/1988 | Japan | 29/890.1 |
| 0197652 | 8/1988 | Japan | 29/890.1 |
| 363202455 | 8/1988 | Japan | 29/890.1 |
| 63-295269 | 12/1988 | Japan . | |
| 224220 | 5/1990 | Japan . | |
| 242670 | 9/1990 | Japan . | |
| 404158045 | 6/1992 | Japan | 29/890.1 |
| 404191053 | 7/1992 | Japan | 29/890.1 |

*Primary Examiner*—Irene Cuda

*Attorney, Agent, or Firm*—Sughrue, Mion, Zinn, Macpeak & Seas

[57] ABSTRACT

A method of manufacturing an ink jet head including the steps of: laminating a dry film photoresist 51 on an inner surface of a nozzle plate 2, the dry film photoresist being a photohardening resin; exposing the photoresist 51 with such energy as to half-harden the photoresist while superposing thereon a photomask M1 having a predetermined masking pattern; developing the thus exposed photoresist 51; laminating a photoresist 52; secondarily exposing the photoresists 51, 52 to form a partially hardened portion 5C; bonding an elastic plate on the portion 5C; and integrating the bonded plates while hardening them by heating.

7 Claims, 8 Drawing Sheets

2
21

51
2 a
c
b
M1
51
2

51B
51A
51B
51A
51
2

51
2

52A
52
51
2 d
M3
52
51
2
52C
51C
51a
51B
51C

METHOD OF MANUFACTURING INK JET HEAD

BACKGROUND OF THE INVENTION

1. Field of the Invention

The invention relates to a method of manufacturing ink jet heads used in ink jet printers.

2. Related Art

A method of forming a head using a photohardening resin is disclosed in Japanese Patent Examined Publication No. 42670/1990. The head is used in a so-called ink jet printer in which ink portions contained in independently arranged ink chambers are selectively pressured to form ink droplets, which are then jetted out of corresponding nozzles.

The disclosed method involves the steps of: exposing and developing a photohardening resin laminated on a substrate to form ink chambers and ink flow paths thereon; and then bonding a nozzle plate thereon with an adhesive.

However, uniform application of the adhesive on the bonding surface having the ink chambers and the ink flow paths is so difficult that some of the adhesive is forced out into the small ink flow paths to block the jetting of ink droplets. In addition, adhesion is not strong enough due to the adhesive not being applied thick enough, or pressure leaks occur to adjacent ink chambers.

SUMMARY OF THE INVENTION

The invention has been made in view of the above circumstances. Accordingly, an object of the invention is to provide a method of manufacturing an ink jet head for an ink jet printer, the method being characterized as forming a cavity forming substrate that has a reinforced portion and a bonding portion by the process of exposing and developing a photohardening resin. That is, a laminated film of a photohardening resin is first exposed on a substrate so as to be half hardened, and then developed to form predetermined ink chambers and ink flow paths thereon. Successively, the bonding surface of the thus processed substrate is subjected to secondary exposure to locally form a hardened portion. With the profile of the cavity forming layer maintained by this hardened portion, the other substrate is integrally bonded thereon by the half-hardened photohardening resin portion.

Another object of the invention is to provide a method characterized as preventing leakage of ink and pressure from the ink chambers and the like. That is, a peripheral portion around each ink chamber and each ink flow path, the peripheral portion excluding a portion near them, is subjected to secondary exposure so that the peripheral portion can be hardened. While preventing deformation of the ink chamber and the ink flow path by the hardened portion, the peripheral portion around the ink chamber and the ink flow path is bonded surely by the half-hardened resin portion near them.

Still another object of the invention is to provide a method characterized as forming a rigid wall by secondary exposure of the portion around each ink chamber and each ink flow path in order to improve the accuracy in forming the ink chamber and the ink flow path.

Still another object of the invention is to provide a method characterized as achieving consistent bonding by eliminating partial inconsistency in the area of the bonding surface as well as deformation of the substrate which occurs during the forming process.

DETAILED DESCRIPTION OF THE PREFERRED EMBODIMENTS

Embodiments of the invention will now be described with reference to the accompanying drawings.

Figures 1A, 1B, 1C, 1D, 1E, 1F, 1G:
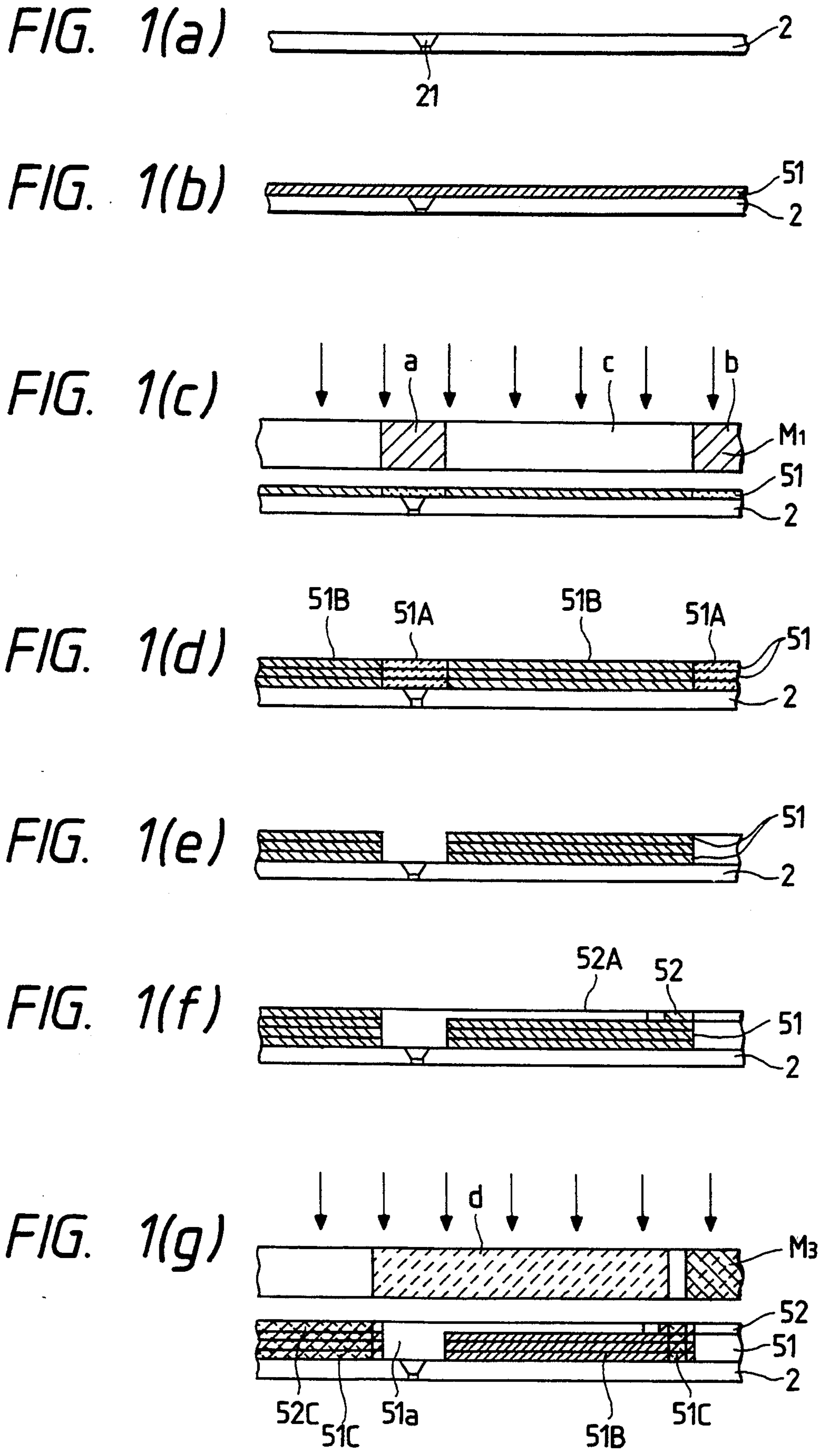
FIGS. 1(*a*) to 1(*g*) are diagrams showing the steps of forming a cavity forming layer on the side of a nozzle plate, which is an embodiment of the invention.
Figure 2A:
FIGS. 2(*a*) to 2(*g*) are diagrams showing the steps of forming a cavity forming layer on the side of an elastic plate in the above embodiment.
Figure 2B:
Figure 2C:
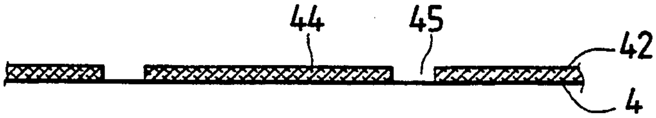
Figure 2D:
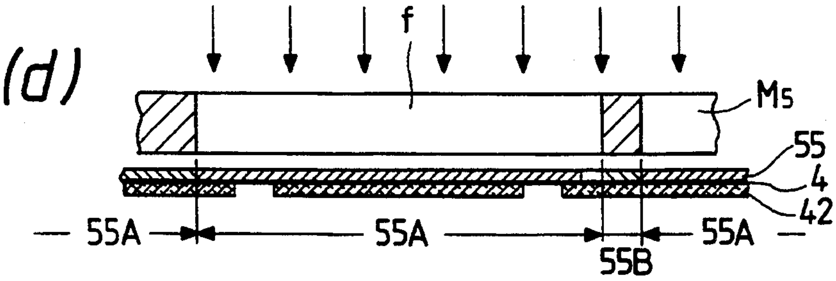
Figure 2E:
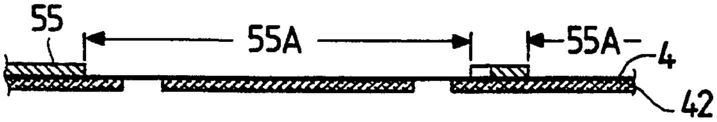
Figure 2F:
Figure 2G:
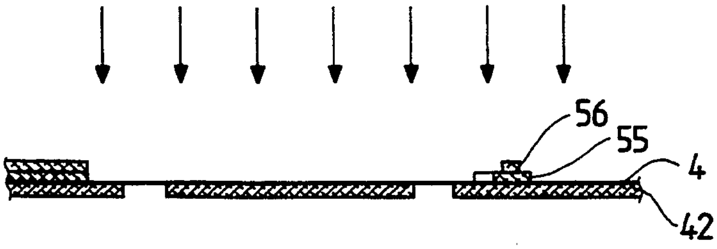
Figure 14:
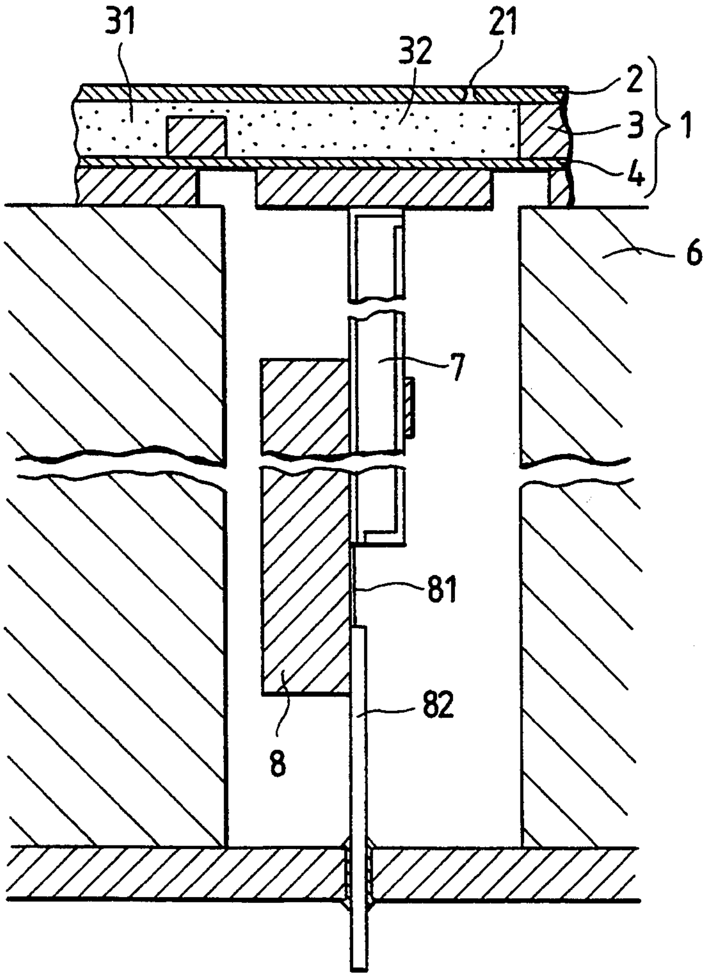
FIG. 14 is a diagram showing an example of an ink jet head having a cavity type substrate formed by a method of the invention.

FIGS. 1 and 2 show a method of manufacturing a cavity forming substrate constituting a piezoelectric ink jet head, which is an embodiment of the invention. FIG. 14 shows an ink jet head having a cavity forming substrate prepared by the above-mentioned manufacturing method.

An ink jet head using this substrate will be described briefly with reference to FIG. 14.

A cavity forming substrate 1 includes: a nozzle plate 2 having a plurality of nozzles 21; a cavity forming layer 3 having a common reservoir 31 and individual ink chambers 32; and an elastic plate 4 elastically deforming so as to apply pressure to ink contained in each ink chamber 32. The cavity forming substrate 1 is bonded to the top surface of a head frame 6.

A top end of a piezoelectric vibrating element 7 is bonded to the elastic plate 4 with the base end thereof supported by a fixed plate 8. The piezoelectric vibrating element 7 is longitudinally contracted and expanded by an alternating electric field applied through a wiring pattern 81 and a lead frame 82, both mounted on the fixed plate 8, to deform the elastic plate 4. As a result, the ink contained in each ink chamber is pressured to be jetted out in the form of an ink droplet from the corresponding nozzle 21.

The method of preparing the cavity forming substrate 1 will be described with reference to FIGS. 1 and 2.

FIGS. 1(*a*) to 1(*g*) show the steps of preparing a cavity forming layer 23 on the side of the nozzle plate 2. A dry film photoresist 51 of, e.g., a negatively photosensitive epoxy acrylate is laminated on an inner surface, or a cavity forming surface, of the nozzle plate 2 shown in FIG. 1(*a*), by heating or applying pressure. The dry film photoresist 51 is not fluid but adhesive, so that the dry film photoresist 51 can be bonded easily by merely applying a small external force to the nozzle plate 2 (FIG. 1(*b*)).

Figure 3:
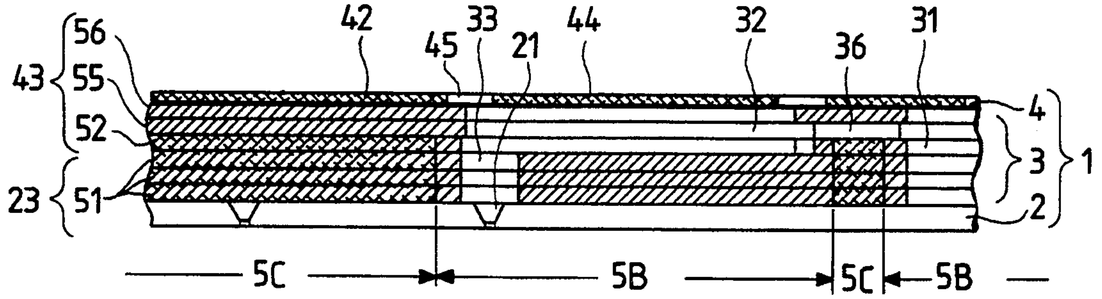
FIG. 3 is a sectional view showing an integrally bonded cavity forming substrate.

Then, a photomask M1 is positioned thereon so as to match either a not shown positioning pattern formed on the nozzle plate 2 or the nozzle 21. The photomask M1 has preformed opaque patterns a and b so that a flow path 33 and the reservoir 31 that communicates with the nozzle 21 will later be formed thereon as shown in FIG. 3.

As shown in FIG. 1(*c*), when light is injected onto the dry film photoresist 51 from over the photomask M1 as parallel rays in such an amount as not to harden the photoresist, e.g., about 90 mJ/cm$^2$, the flow path 33 and the reservoir 31 remain on the surface of the dry film photoresist 51 as unexposed portions 51A that correspond to the opaque portions a, b, whereas the other transparent portions c are left half-hardened; i.e., the portions c become half-hardened portions 51B that are insoluble to a solvent but are adhesive.

In the above-mentioned embodiment, a light energy is used to provide the half-hardened portions. However, any other energy which activates a photosensitive resin such as an electron beam may be used instead of the light energy.

A laminated body of a predetermined thickness having both the unexposed portions 51A and the half-hardened portions 51B is formed on the surface of the nozzle plate 2 by repeating such lamination of the dry film photoresist 51 and exposure (FIG. 1(*d*)). Then, the unexposed portions 51A are removed from the laminated body made of films of dry film photoresist 51 using a solvent such as trichloroethane (FIG. 1(*e*)).

As a next step, a dry film photoresist 52 for forming an ink chamber is laminated on the thus processed laminated body, and the ink chamber 32 is formed by the steps of similarly exposing the dry film photoresist 52 while positioning thereon a not shown transparent photomask having an opaque pattern corresponding to the ink chamber 32 and then removing the unexposed portion 52A (FIG. 1(*f*)).

Figure 4:
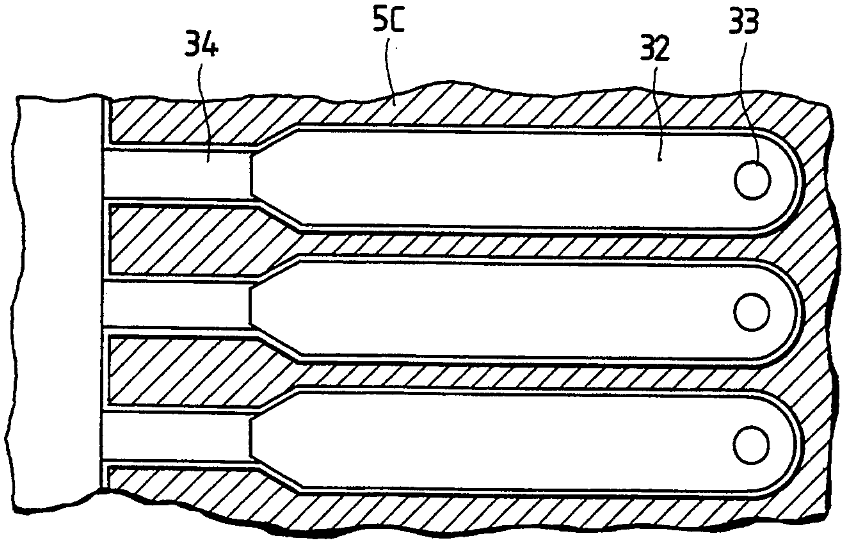
FIG. 4 is a plan view showing a part of the bonding surface of an ink jet head in enlarged form.

As the last step, part of the laminated body having both dry film photoresists 51 and 52 is subjected to secondary exposure so that such part can be hardened. In this exposure, a photomask M3 having an opaque pattern d for masking a portion slightly larger than the unexposed portions 51A and 52A is used as shown in FIG. 1(*g*). Light whose energy is large enough to harden the half-hardened dry film photoresist portions 51B, 51B, e.g., about 2J/cm$^2$, or more preferably, 5J/cm$^2$ is injected from above the photomask M3 to form hardened portions 52C, so that the entire part of a wall forming portion that excludes a portion around the ink chamber 32, the reservoir 31, and an ink supply portion 34 connecting the ink chamber 32 to the reservoir 31 (FIGS. 3 and 4) is formed into a hardened portion 52C. The hardened portion is provided so that the cavity forming layer 3 is not deformed by pressure applied at the time of bonding.

A cavity forming layer 43 is formed by a process shown in FIGS. 2(*a*) to 2(*g*).

The elastic plate 4 used in this embodiment is a metal thin plate having a thickness of 5 μm or less prepared by nickel electroforming. A dry film photoresist 59 is first laminated on a surface of the elastic plate 4, i.e., a surface to which the end of the piezoelectric vibrating element 7 is bonded. The dry film photoresist 59 is of the same type as the dry film photoresists 51, 52 arranged on the side of the nozzle plate 2. A coating of a liquid photosensitive resin applied by the spinner method or the roll coating method may be used instead of the dry film photoresist.

The dry film photoresist 59 is exposed with a photomask placed thereon, and then developed to form such an insulating layer 42 as shown in FIG. 2(*c*). Although not shown, the photomask employed in this process has a ring-like opaque pattern slightly narrower than the ink chamber 32 but slightly larger than the section of the piezoelectric vibrating element 7. Accordingly, an island-like thick portion 44 is formed in the middle through a ring-like thin portion 45 on the surface of the elastic plate 4 from which the ring-like unexposed portion has been removed by the post-exposure developing process. The portion 44 comes in contact with the piezoelectric vibrating element 7.

Then, a dry film photoresist 55 of the same type as the dry film photoresists 51 and 52 arranged on the nozzle plate 2 is laminated on the back of the elastic plate 4 while inverting the elastic plate 4. As shown in FIG. 2(*d*), a photomask M5 having an opaque pattern f for forming an ink chamber 32, a reservoir 31, and an ink supply portion 34 is put in place, and light having energy large enough to harden the dry film photoresist 55, i.e., about 5J/cm$^2$ is irradiated thereto to form a hardened portion 55B on the dry film photoresist 55, the hardened portion being around these portions 32, 31 and 34.

The dry film photoresist 55 which is on the unexposed portion 55A is removed by a solvent (FIG. 2(*e*)); a dry film photoresist 56 is laminated thereon, and is exposed and developed using a not shown photomask having an opaque pattern which corresponds to the ink chamber 32 and the reservoir 31 and which excludes the ink supply portion 34 (FIG. 2(*f*)); and as the last step, the entire part of the dry film photoresists 55 and 56 are subjected to secondary exposure and then heated so that the dry film photoresists 55 and 56 are hardened.

The cavity forming layer 23 on the side of the nozzle plate 2 and the cavity forming layer 43 on the side of the elastic plate 4, both having been formed in the above-mentioned processes, are bonded together by pressure. Then, as shown in FIG. 3, both are bonded integrally with each other with the cavity forming layer 23 on the nozzle plate 2 side not being deformed by the portion 5C which is around the ink chamber and which has been hardened by the secondary exposure and with the half-hardened portion 5B being bonded onto the surface of the cavity forming layer 43 on the elastic plate 4 side.

Figure 5:
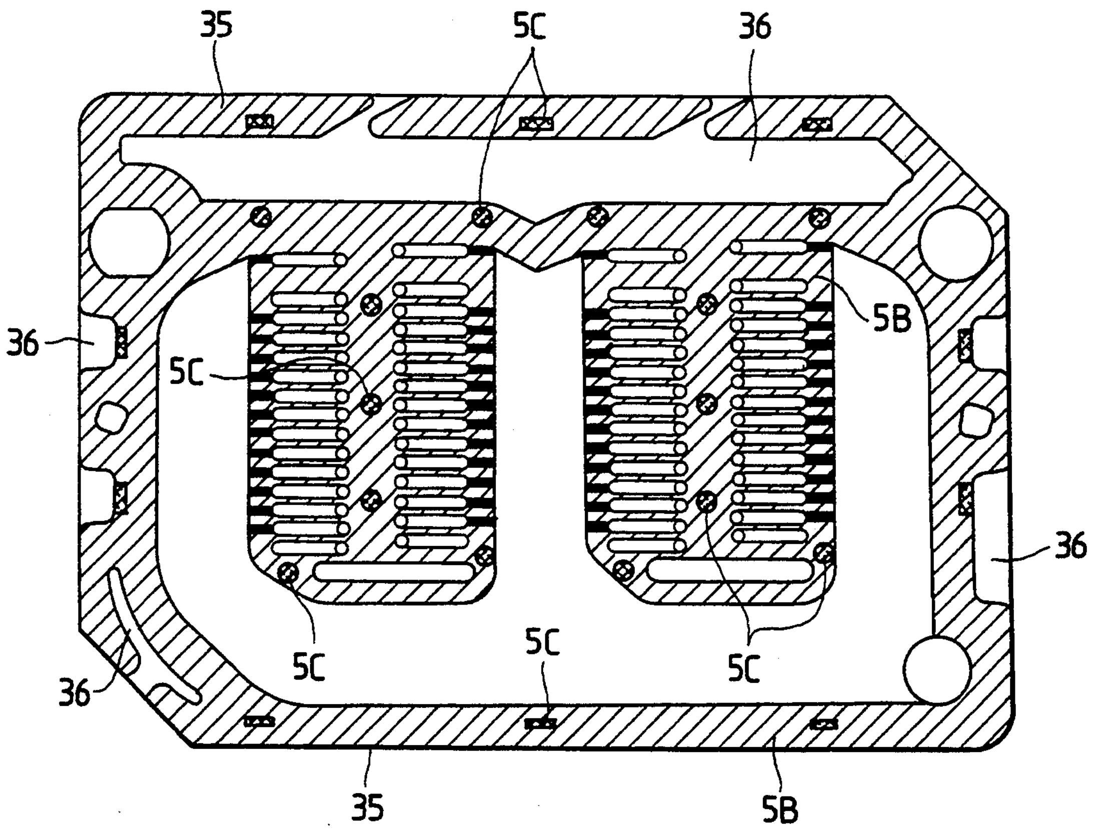
FIG. 5 is a plan view showing the entire part of the bonding surface.

This embodiment is characterized as bonding the cavity forming layer 23 on the side of nozzle plate 2 to the cavity forming layer 43 on the side of the elastic plate 4 while leaving the portion around the ink chamber 32 of the cavity forming layer 23 not subjected to secondary exposure. As the gap between adjacent ink chambers is narrowed in order to arrange the nozzles in a higher density, columnar hardened portions 5C are formed by subjecting portions near a relatively large bonding portion 35 around the reservoir 31, as well as the ink supply portion 34 and the like requiring high accuracy in profile to spot-like secondary exposure as shown in FIG. 5. These hardened portions 5C are utilized to prevent the ink chambers 32 and the like from being deformed.

In this embodiment, lightened portions 36 are formed in the relatively large bonding portion 35 that surrounds the reservoir 31, particularly, portions not affecting the function of the ink jet head, out of the cavity forming layers 23, 43 which are formed on the nozzle plate 2 and the elastic plate 4, respectively, as shown in FIG. 5. Such lightened portions are provided to keep the bonding surface area from being partially inconsistent. This arrangement obviates inconveniences that the nozzle plate 2 and the elastic plate 4 are bent due to the soft dry film photoresist 5 on the half-hardened portion 5B inconsistently affecting part of the nozzle plate 2 and the elastic plate 4 or that the bonded surface is separated due to inconsistent heating at the time of bonding.

Figure 6:
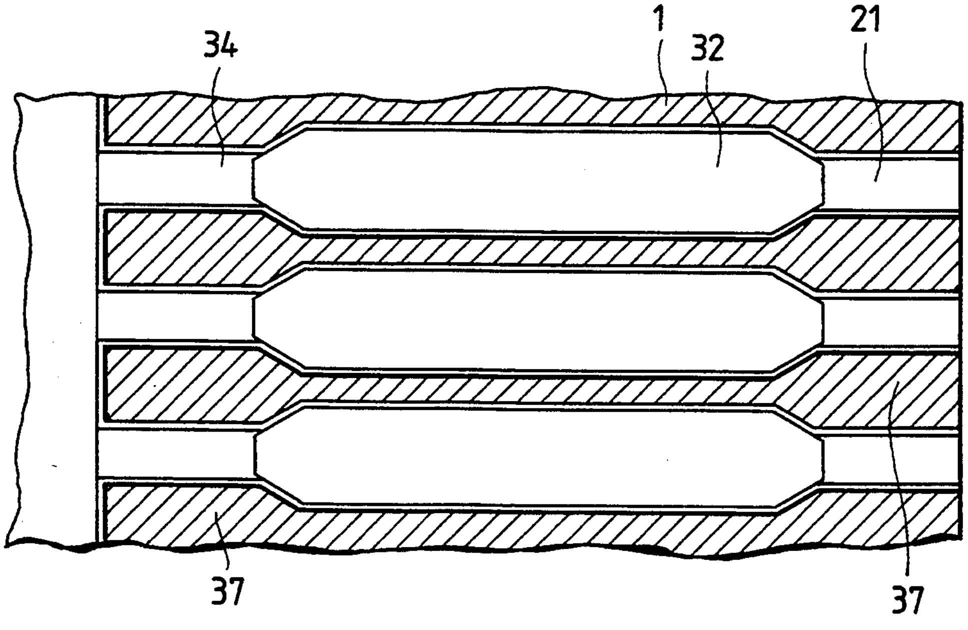
FIG. 6 is a plan view showing a part of a bonding surface of an ink jet head of another type in enlarged form.

Further, to form a so-called edge type cavity forming substrate in which the axis of a nozzle 21 runs in parallel to the plane of the substrate 1 as shown in FIG. 6, a sidewall portion 37 of the nozzle 21 and of the ink supply portion 34 and a portion around such sidewall 37 are subjected to secondary exposure.

Figure 7:
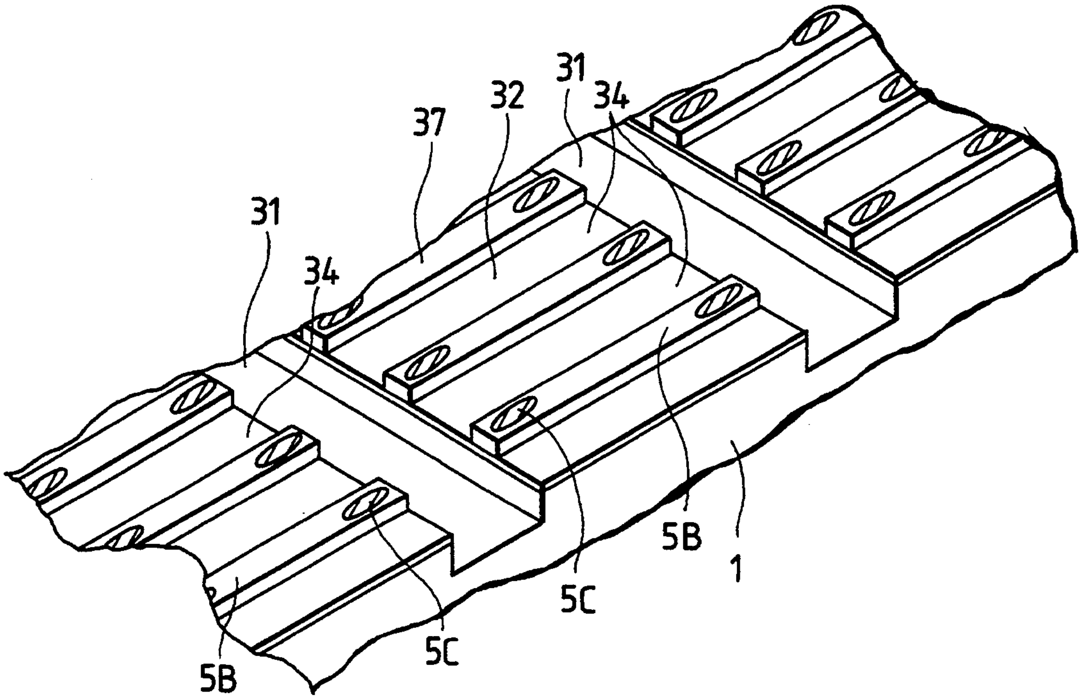
FIG. 7 is a perspective view showing a part of a bonding surface of an ink jet head of still another type in enlarged form.

Still further, to form a cavity forming substrate 1 such as shown in FIG. 7, i.e., a cavity forming substrate of such a type that ink is supplied to an ink chamber 32 from a reservoir 31 arranged at both ends thereof through ink supply paths 34 having no constriction, the following steps will be taken. First a sidewall portion 37 defining the ink chamber 32 on the side of the elastic plate 4 is formed so as to be half-hardened. Then, a columnar hardened portion 5C is formed by subjecting the sidewall portion 37 to spot-like secondary exposure. The thus formed sidewall portion 37 is further bonded by a half-hardened portion 5B to a not shown nozzle plate placed thereon and then heated for hardening.

Figure 8:
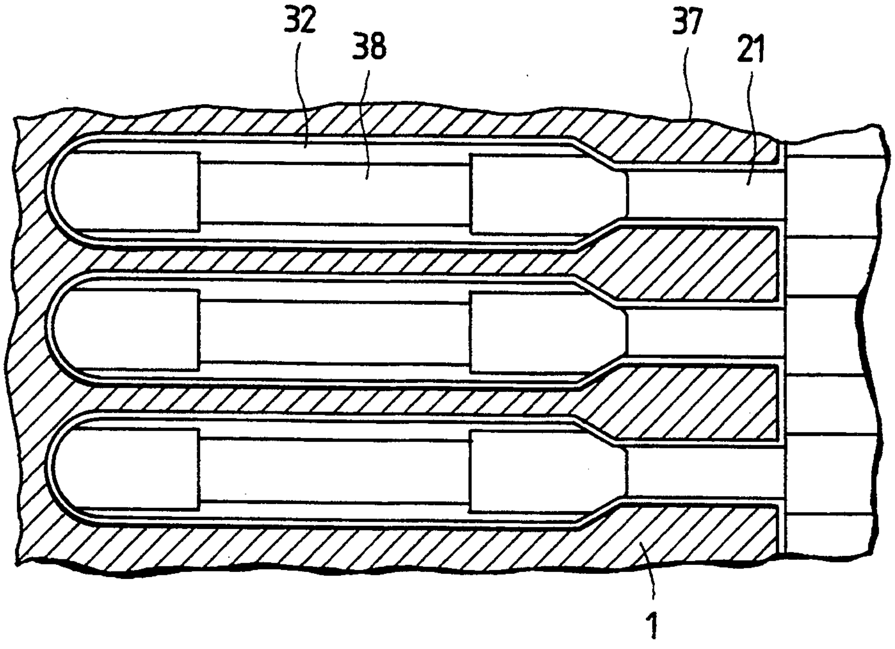
FIG. 8 is a plan view showing a part of a bonding surface of an ink jet head of still another type in enlarged form.

Still further, in the case of a cavity forming substrate 1 having a heating element 38 such as shown in FIG. 8, an ink chamber 32 and a nozzle 21, which are half-hardened, are first formed on a substrate made of glass or silicon with the heating element 38 mounted thereon. A sidewall portion 37 excluding a portion around the ink chamber 32 is then subjected to secondary exposure for hardening.

Figure 9A:
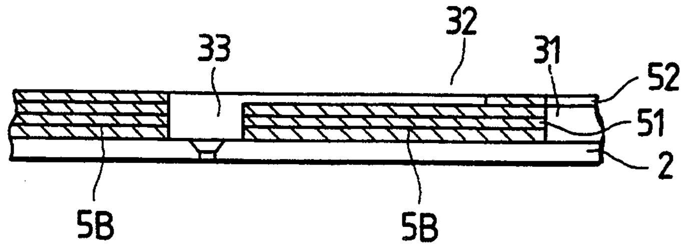
FIGS. 9(*a*) and 9(*b*) are diagrams showing a part of a forming process, which is another embodiment of the invention.
Figure 9B:
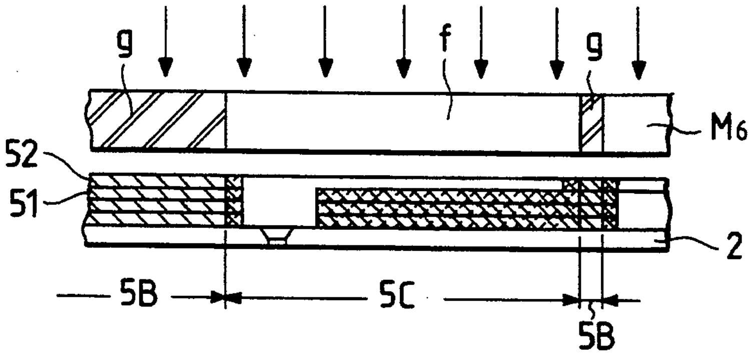

FIG. 9 shows a second embodiment of the invention, particularly, the process of secondary exposure to be effected on the dry film photoresists 51 and 52 on the half-hardened portion 5B formed on the nozzle plate 2.

In this embodiment, the description of the steps corresponding to those shown in FIGS. 1(*a*) to 1(*f*) will be omitted since they have been already described with reference to FIGS. 1(*a*) to 1(*f*). That is, these are the steps of forming the ink chamber 32, the reservoir 31, the flow path 33, and the like by repeating the process of laminating the dry film photoresists 51, 52 on the nozzle plate 2 and subjecting the laminated photoresists to such exposure as not to harden the photoresists and to development.

The half-hardened portion 5B out of the thus formed layers of dry film photoresists 51, 52 are then to be subjected to secondary exposure. To do so, a photomask M6 having an opaque pattern g as a portion excluding a transparent portion f that is slightly larger than the ink chamber 32 as shown in FIG. 9(*b*) is used. This opaque pattern g is positioned on the layers of dry film photoresists 51, 52. Then, parallel rays of light whose energy is sufficient for hardening, i.e., from $2J/cm^2$ to $5J/cm^2$, are irradiated thereto.

Figure 10:
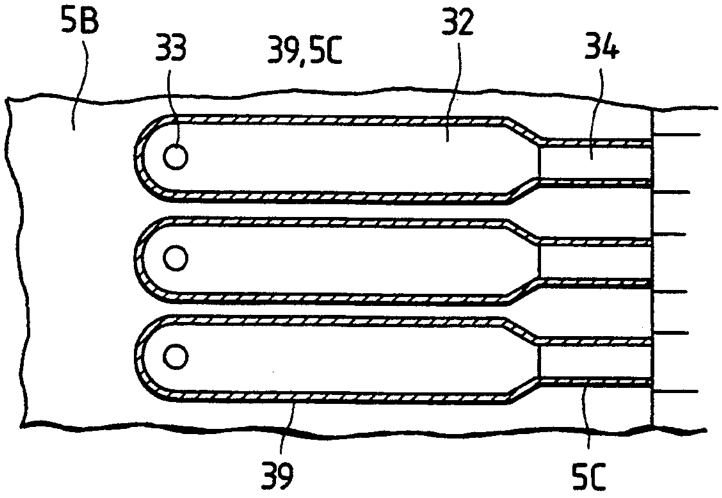
FIG. 10 is a plan view showing a part of a bonding surface obtained by the process shown in FIGS. 9(*a*) and 9(*b*) in enlarged form.

Accordingly, as shown in FIG. 10, the films of dry film photoresists 51 and 52 are processed so that only a sidewall portion 39 surrounding the ink chamber 32 and the ink supply portion 34 is formed into a hardened portion 5C.

Thus, by bonding this cavity forming layer 23 to a not shown cavity forming layer 43 on the elastic plate 4 by pressure, both layers 23 and 43 are bonded together by an adhesive force provided by the half-hardened portion 5B with the boundaries of the ink chambers 32 and the ink supply portion 34 maintained by the sidewall portion 39. As the final step, the entire part of the bonded layers is subjected to a hardening process by heating so as to form an integral body.

Figure 11:
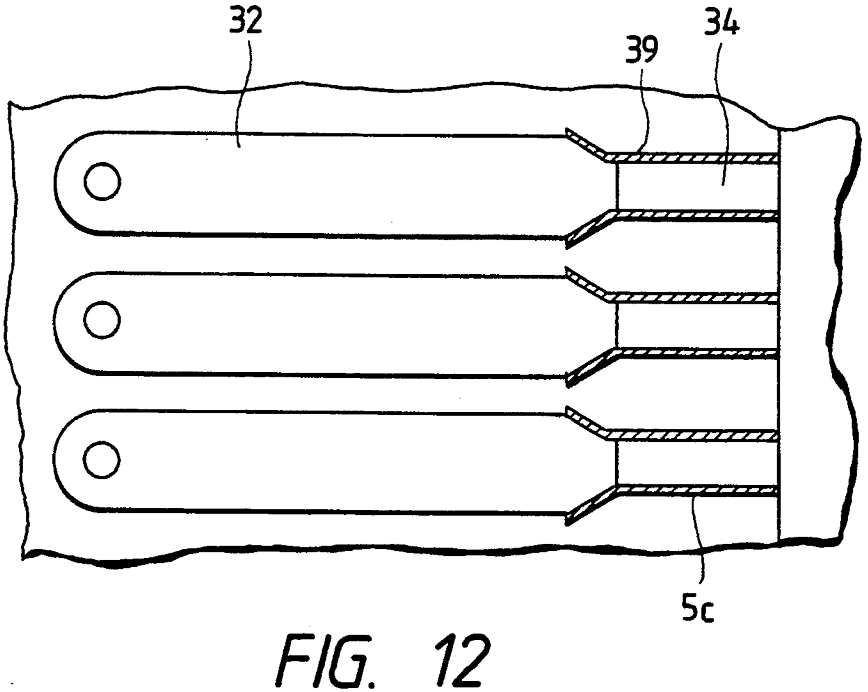
FIG. 11 is a plan view showing a part of a bonded surface of an ink jet head of another type in enlarged form.

FIG. 11 is an embodiment characterized as controlling deformation of the ink supply portion 34 that requires a particularly stringent accuracy in profile. Such control is accomplished by subjecting the sidewall portion 39 of the ink supply portion 34 to secondary exposure by the above-mentioned method so that such sidewall portion can be formed into a hardened portion 5C.

Figure 12:
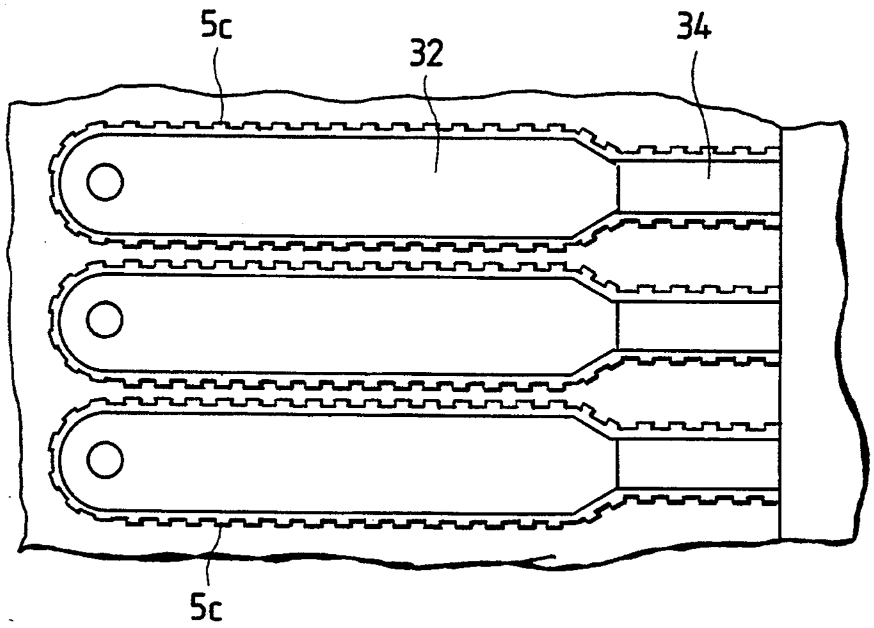
FIG. 12 is a plan view showing a part of a bonding surface of an ink jet head of still another type in enlarged form.

FIG. 12 is an embodiment characterized as further reinforming the sidewall portion 39 by forming an indented hardened portion 5C around both the ink chamber 32 and the ink supply portion 34 by the above-mentioned method.

Figure 13:
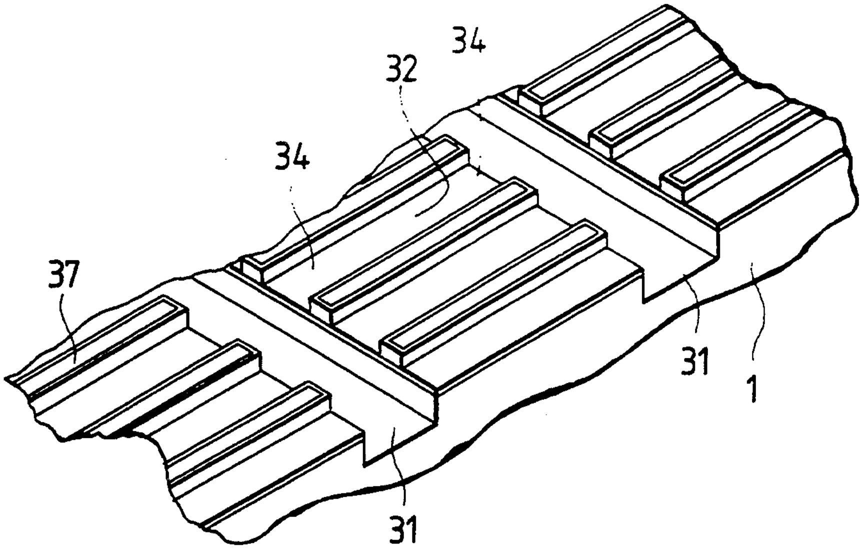
FIG. 13 is a perspective view showing a part of a bonding surface of an ink jet head of still another type in enlarge form.

Further, with respect to a cavity forming substrate 1 such as shown in FIG. 13, i.e., a cavity forming substrate 1 of such a type that ink is supplied to an ink chamber 32 from a reservoir 31 arranged at both ends thereof through ink supply portions 34 that have no constriction, a peripheral portion of a sidewall portion 37 that defines the ink chamber 32 and the ink supply portions 34 is hardened by the abovementioned method in such a manner that such peripheral portion surrounds the sidewall portion 37.

Still further, this last embodiment is applicable to a cavity forming substrate of a so-called edge type in which the axis of a nozzle runs in parallel to the plane of the substrate 1 or to a cavity forming substrate of a so-called bubble type in which a heating element is arranged in a flow path immediately before a nozzle, so that the sidewall of the ink chamber and of the nozzle can be hardened by secondary exposure.

What is claimed is:

1. A method of manufacturing an ink jet head, comprising the steps of:

laminating a photohardening resin on a first substrate;

first exposing and then developing said photohardening resin by activation energy rays having an energy level to half-harden said photohardening resin;

forming a cavity required for jetting ink;

secondarily exposing a part of said photohardening resin to harden said part by activation energy rays having an energy level for full hardening; and bonding a second substrate to a bonding surface of said photohardening resin for integration, said bonding step being accomplished after said first exposing step and said secondarily exposing step.

2. A method of manufacturing an ink jet head according to claim 1, wherein during the step of first exposing and then developing said photohardening resin, a mask having, such a pattern that no partial inconsistency in the area of the cavity forming surface occurs, is used.

3. A method of manufacturing an ink jet head according to claim 1, wherein, in the step of secondarily exposing, said part excludes at least a portion near an ink flow path so that the portion is not fully hardened.

4. A method of manufacturing an ink jet head according to claim 1, wherein, during the step of secondarily exposing, said part includes at least a peripheral portion around an ink flow path so that the peripheral portion is hardened.

5. A method of manufacturing an ink jet head according to claim 1, wherein, during the step of secondarily exposing, said part includes a portion around an ink flow path so that said portion is hardened in indented form.

6. A method of manufacturing an ink jet head according to claim 1, wherein, during the step of secondarily exposing, said part includes a portion around an ink supply portion connecting an ink reservoir to an ink chamber so that said portion is hardened.

7. A method of manufacturing an ink jet head according to claim 1, wherein, during the step of secondarily exposing, said part includes a portion around a wall defining an ink flow path so that said portion is hardened.

* * * * *